April 16, 1946.  C. PIETSCH  2,398,665

FLUID CLUTCH

Filed May 6, 1943  2 Sheets-Sheet 1

Inventor
CARTER PIETSCH
By Munson H. Lane
Attorney

April 16, 1946.　　　　C. PIETSCH　　　　2,398,665
FLUID CLUTCH
Filed May 6, 1943　　　　2 Sheets-Sheet 2

Inventor
CARTER PIETSCH
By Munson H. Lane
Attorney

Patented Apr. 16, 1946

2,398,665

UNITED STATES PATENT OFFICE 2,398,665

FLUID CLUTCH

Carter Pietsch, Bloomington, Ill.

Application May 6, 1943, Serial No. 485,911

1 Claim. (Cl. 60—54)

The present invention relates to improvements in fluid clutches or transmission mechanism.

The primary object of the invention is to provide an improved hydraulic clutch or transmission mechanism which may be operated to produce a reverse drive without requiring the use of gears or other costly assemblies.

A further object of the invention is to provide a hydraulic fluid transmission between a drive and driven shaft which will allow the driven shaft to be rotated in a forward or reverse position from a neutral position without the use of valves or other fluid flow control devices, thereby eliminating resultant leakage of the fluid medium and the reduction of operation costs.

A still further object of the invention is to provide a hydraulic transmission with a single control member for effecting a forward and reverse movement of a driven shaft which is composed of comparatively few parts to become disorganized and which may be constructed at a minimum production cost.

In accordance with my invention the driving and driven shafts are in longitudinal alignment and one is adapted to be moved axially with reference to the other. A centrifugal driving impeller or primary runner is keyed to the driving shaft and a driven turbine member or secondary runner is keyed to the driven shaft. The runners are enclosed within an internally ribbed transmission casing or housing which is freely rotatable with reference to both the shafts and the runners, but is adapted to be moved longitudinally with one of the shafts. The casing contains suitable transmission fluid. The driving runner is double-acting and is adapted to draw transmission fluid from either end and to discharge the same radially or centrifugally after the fashion of a turbine wheel. The driven runner is open at one end and closed at the other and is provided with inclined peripheral blades, and is adapted to serve selectively as an outward or an inward flow turbine. The two runners are of such size and shape as to permit the telescoping of the driving runner within the driven runner or turbine as the driving and driven shafts are moved toward one another. When in such telescoped position rotation of the driving shaft and the driving runner causes a rotation in the same direction of the driven runner acting as an outward flow turbine, and of the driven shaft to which it is secured. When, on the other hand, the driving runner is outside of the driven runner, rotation of the driving shaft in one direction operates through the primary and secondary runners to cause rotation of the driven shaft in the opposite direction, the secondary runner functioning as an inward flow turbine. A neutral position is attained when the driving runner is half way within and half way without the driven runner.

The invention will be more readily understood by reference to the accompanying drawings and the following detailed description, in which there is set forth an illustrative embodiment of the invention.

In the drawings—

The principal elements of the transmission are:

(1) A double-ended impeller or primary runner A of relatively small diameter and keyed or otherwise secured to a driving shaft. This impeller is open at both ends and is adapted to axially receive transmission fluid from either end while discharging it centrifugally;

(2) A secondary runner or turbine member B of larger diameter than the primary runner A, which secondary runner is mounted and secured to a driven shaft. The secondary runner is closed at one end but open at the other, the opening being sufficiently large to permit the driven runner to be telescoped over the driving impeller when the shafts are shifted longitudinally toward one another; and (3) A freely rotatable housing or casing for the runners A and B, which casing is adapted to be moved longitudinally with the driven runner and the driven shaft and is internally ribbed to arrest and deflect the rotation of the impeller fluid leaving the primary runner. Suitable brake means may be provided for preventing rotation of the casing when reverse rotation of the driven shaft is desired.

Figure 2:
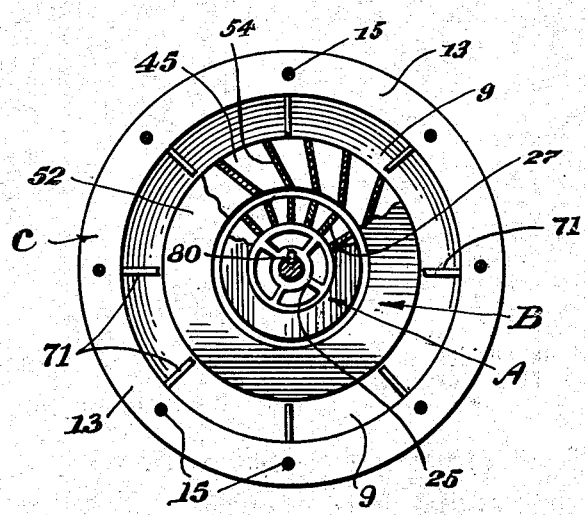
Fig. 2 is a vertical sectional view on the line 2—2 of Fig. 1 looking in the direction of the arrows and illustrating the relative arrangement of the runner blades carried by the moving parts of the assembly.

Referring in detail to the drawings, reference numeral 22 denotes a driving shaft adapted to be connected to a motor or the like for driving the shaft in one direction. As shown, the free end of the driving shaft extends into the hollow end portion 33 of a driven shaft 35. The driven shaft 35 is adapted to be moved longitudinally with reference to the driving shaft 22. The impeller or primary runner A is secured to the driving shaft by means of a key 80 (Fig. 2). The primary runner includes a spoked hub portion 25 and a series of radially extending impeller blades 27 which are connected along their front and rear edges by inclined deflecting rings 29 and 31. This construction provides a double-acting impeller having an open eye at each end through which fluid may be drawn into the impeller, while the radial blades 27 serve to impel the fluid centrifugally outwardly after the manner of a turbine.

Figure 1:
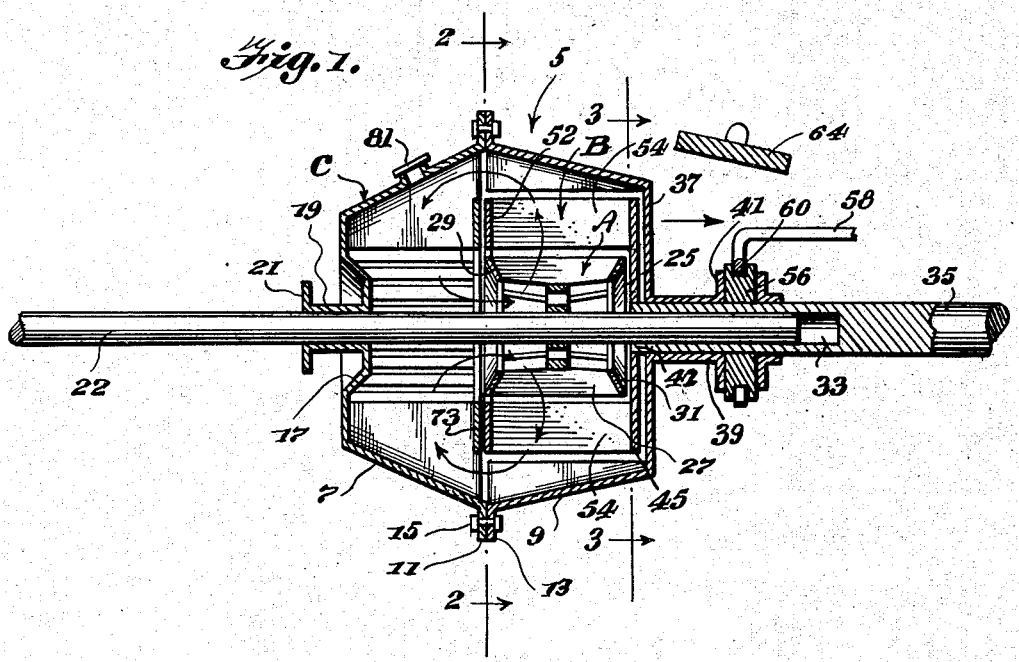
Fig. 1 is a longitudinal sectional view illustrating the operative parts of the transmission with the driven runner telescoped over the driving runner so as to cause rotation of the driving and driven shafts in the same direction.
Figure 3:
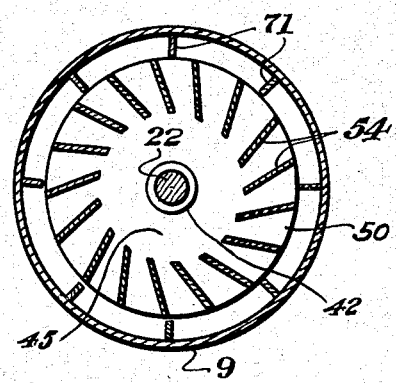
Fig. 3 is a vertical cross sectional view taken on line 3—3 of Fig. 1 looking in the direction of the arrows and illustrating in detail the inclined position of the vanes carried by the driven shaft.

As shown, the secondary runner or turbine B is secured over the recessed end of the driven shaft 35. This runner is open at one end only, as contrasted with the double-ended primary runner or impeller A. The end 42 of the driven shaft functions as a hub for the runner and said runner is closed at one end by a radially extending disk 45, the peripheral portion 50 of which disk is connected by a series of inclined impeller blades 54 to a peripheral ring 52, the open center portion of which ring forms the open eye of the secondary runner and is of sufficient size to allow the primary and secondary runners to be telescoped as indicated in Fig. 1. As shown in Figs. 2 and 3, the blades 54 are inclined and are preferably tangentially disposed with respect to the shafts 22 and 35.

The transmission casing C is mounted for rotation with respect to both the driving and driven shafts 22 and 35. As shown the casing is provided with a bearing 19 at one end fitting over the shaft 22, which bearing is shown as flanged at 21. At the other end of the casing a bearing 39 is provided fitting over the end of the driven shaft 35. This bearing is flanged at 41 so as to provide an abutment for a collar 56 mounted upon the driven shaft 35.

Figure 4:
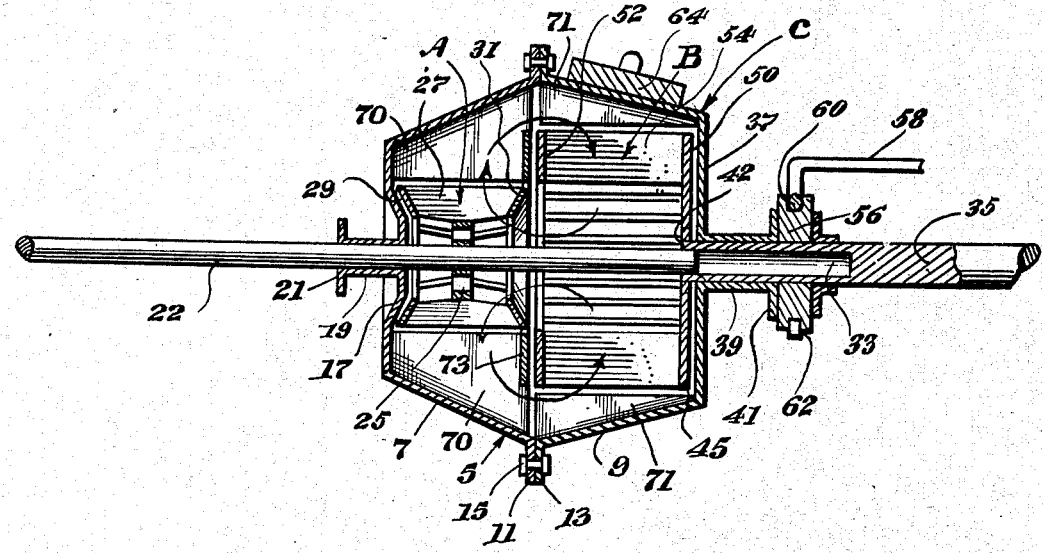
Fig. 4 is a longitudinal cross sectional view similar to Fig. 1 but showing the driving runner outside of the driven runner in a position for producing reverse rotation of the driven shaft.

It will be noted that the end of the casing adjacent the bearing member 19 is inwardly dished and is provided with an inclined portion 17 which corresponds with the inclination of the ring 29 at one end of the impeller A. This insures a close fit between the impeller A and the end of the casing when the parts are in the position shown in Fig. 4. Similarly, the opposite end 37 of the casing is shaped to conform to the radial disk 45 which serves to close the secondary impeller B at one end thereof. As shown the outer wall 5 of the transmission housing is made up of two parts, 7 and 9, which are frusto-conical in form and are provided with external radial flanges 11 and 13 held together by bolts 15. Any suitable transmission fluid may be supplied to the casing through a plugged opening 81. As shown the casing is provided with two sets of internal ribs 70 and 71, the ribs 70 being secured to the section 7 of the casing and the ribs 71 being secured to the section 9 thereof. The ribs 70 extend inwardly a sufficient distance so as to snugly enclose the impeller A, as best indicated in Fig. 4, and the ribs 71 extend inwardly nearly to the periphery of the secondary impeller B. An annular ring 73 corresponding to the ring 52 on the runner B is secured to the ribs 70 adjacent to the ring 52, and coacts with the ribs 70 and 71 and the ring 52 in directing the transmission fluid to or from the inclined blades 54 of the secondary impeller.

As has been previously pointed out the primary runner A is keyed to the driving shaft 22 and rotates therewith. Similarly, the secondary runner B is secured to the driven shaft 35 and rotates therewith. The casing C is independently rotatable with reference to both runners A and B, but is adapted to be moved longitudinally with the driven shaft 35 and the secondary runner B. Longitudinal movement of the shaft 35 together with the runner B and casing C may be effected in any suitable manner. As shown a control rod 58 is provided with a yoke 60 which fits in a groove 62 in the collar 56 secured to the shaft 35. The collar 56 may rotate with reference to the yoke 60, but movement of the rod 58 in either direction will bring about corresponding axial shifting of the driven shaft 35, the impeller B and the casing C.

For the purpose of preventing rotation of the casing C when reversal of the driven shaft 35 is to be effected a stationary brake element 64 may be provided at an angle to engage the section 9 of the casing when the parts are shifted to the position shown in Fig. 4. In such position the casing is prevented from rotation but the shafts 22 and 35, with their respective runners A and B, are freely rotatable with reference thereto.

*Operation*

It will be obvious from the foregoing description that the driven shaft 35, the secondary impeller B and the casing C may be moved to positions wherein the primary runner A is either partially within and partially outside of the secondary runner B, or wholly within the runner B, as indicated in Fig. 1, or wholly outside of the runner B, as indicated in Fig. 4. These positions are, respectively, the neutral position, the forward position and the reverse position.

In the forward drive position indicated in Fig. 1, wherein the primary runner A lies wholly within the secondary runner B, transmission fluid is drawn inwardly through the open eye of the impeller A at the left thereof and is discharged in the direction of the arrows by means of the radially extending vanes 27 of the impeller A, against the inclined vanes 54 of the secondary runner B, thereby imparting to the secondary runner and vanes of the driven shaft 35 a rotation in the same direction as the driven shaft and runner A, the impeller B serving as an outward flow turbine.

When, however, the driven shaft 35, together with the secondary runner B and casing C, are shifted to the right by means of the control rod 58 the inclined interior of the casing will be drawn into contact with the stationary brake 64, thereby preventing rotation of the casing and at the same time the runner B is moved away from the impeller A. The parts then occupy the position shown in Fig. 4. On rotation of the shaft 22 fluid is drawn into the impeller A from the right, as indicated by the arrows, and is discharged outwardly by means of the radial blades 27, the fluid then being directed by means of the stationary ribs 70 and 71 and the ring members 73 and 52 to the periphery of the runner B, thus causing rotation thereof in the direction opposite to the rotation of the impeller A and drive shaft 22, and thereby causing reverse rotation of the driven shaft 35 with reference to the drive shaft 22, the runner B then serving as an inward flow turbine.

In the neutral position (not shown) fluid will be drawn into the impeller A from both ends, thus producing a double circulation of the transmission fluid in opposite directions. The two currents of fluid will thus neutralize one another so that no motion will be imparted to the secondary runner B and the driven shaft 35.

It will be apparent from the foregoing that by a single longitudinal shifting of the relative positions of the primary and secondary runners the hydraulic fluid transmission between the driving and driven shafts is obtained which allows the driven shaft to rotate in a forward or reverse position from a neutral position without the use of valves or other fluid control devices, thereby eliminating resultant leakage of the fluid medium and effecting substantial reduction of operation costs.

The invention has been described in detail for the purpose of illustration, but it will be obvious that numerous modifications and variations may be resorted to without departing from the spirit of the invention.

Thus, while as shown the hub 42 of the secondary runner B is integral with the driven shaft 35, such hub may be formed as a separate member secured to the shaft in any suitable manner, as by key or welding. Moreover, the backplate or flange 45 of the secondary runner may be secured to the hub of the runner or to the end of the driven shaft in any suitable manner, as by key or welding, the particular manner of securing the runner assembly to the shaft being a matter of election. Furthermore, while the collar 56 to which the control rod is secured is shown as retained between two abutments, both of which are removable from the shaft 35 to permit assembling and disassembling of the transmission, such collar 56 may be removably secured to the shaft 35 as by suitable set screw (not shown), or in any other suitable manner. The collars or abutments on the shaft 35 being removable, it will be apparent that the shaft with the runner B permanently secured thereon may be readily inserted in the section 9 of the disassembled casing C, and the collar 56 may then be slipped on the shaft and secured thereto in proper contact with the stuffing box of the casing.

Moreover, the angle of inclination of the blades 54 of the runner B is a matter of hydraulic design, it being essential that they be inclined at such angle to the radial that the runner may serve selectively as an outward or an inward flow turbine, depending on the direction of fluid flow imparted by the impeller A, as indicated by the arrows in Figs. 1 and 4, respectively, the direction of rotation being dependent on the direction of fluid flow therethrough. An inclination of approximately 45° to the radial has been found to produce satisfactory results, although variations from this angle may be found desirable with variations in relative sizes and proportions of other elements of the transmission mechanism.

I claim:

A fluid transmission device comprising aligned driving and driven shafts movable with reference to each other, driving means for rotating one of said shafts, a casing freely rotatable with reference to both shafts, a primary runner of relatively small diameter, adapted to serve as an impeller, housed within one end of said casing and secured to the driving shaft, said impeller being open at both ends, and having peripheral radially disposed blades by which fluid drawn from either end of the impeller may be discharged centrifugally, a secondary or driven runner housed within the other end of said casing and adapted to serve either as an inward or an outward flow turbine according to the relative positions of said primary and secondary runners, said secondary runner being of larger size than the primary runner and being secured to the driven shaft, said secondary runner being open at one end only and having spaced peripheral blades inclined at an angle to the blades of the primary runner, and having an unobstructed interior portion of sufficient size to accommodate the primary runner when their respective shafts are moved toward each other, said casing having two sets of fixed, axially displaced, inwardly directed radial ribs of different sizes, adapted to closely fit the peripheries of the primary and secondary runners respectively, means for axially shifting the casing and the driven runner as a unit to bring said runners selectively into forward, neutral or reversing positions, and means for holding the casing stationary when the parts are in reversing position.

CARTER PIETSCH.